US009024735B2

(12) United States Patent
Matsumoto

(10) Patent No.: US 9,024,735 B2
(45) Date of Patent: May 5, 2015

(54) INDOOR UNIT OF AIR-CONDITIONING APPARATUS

(71) Applicant: Takashi Matsumoto, Tokyo (JP)

(72) Inventor: Takashi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 130 days.

(21) Appl. No.: 13/762,581

(22) Filed: Feb. 8, 2013

(65) Prior Publication Data

US 2013/0229507 A1 Sep. 5, 2013

(30) Foreign Application Priority Data

Mar. 5, 2012 (JP) ................................ 2012-048017

(51) Int. Cl.

*H04N 7/18* (2006.01)
*G08B 13/14* (2006.01)
*G08C 17/02* (2006.01)
*F24F 11/00* (2006.01)

(52) U.S. Cl.

CPC ............ *G08C 17/02* (2013.01); *F24F 11/0009* (2013.01); *F24F 11/0034* (2013.01); *F24F 11/0086* (2013.01); *F24F 2011/0068* (2013.01); *F24F 2011/0091* (2013.01)

(58) Field of Classification Search

CPC .............. F24F 11/0034; F24F 11/0078; F24F 2011/0068; F24F 2011/0035; F24F 2011/0036; B60H 1/00742

See application file for complete search history.

(56) References Cited

U.S. PATENT DOCUMENTS

2008/0186176 A1* 8/2008 Hardacker et al. ......... 340/572.1

FOREIGN PATENT DOCUMENTS

| | | | |
|---|---|---|---|
| JP | 06-337154 | A | 12/1994 |
| JP | 07-027406 | A | 1/1995 |
| JP | 2002-320279 | A | 10/2002 |
| JP | 2006-220405 | A | 8/2006 |

OTHER PUBLICATIONS

Office Action mailed Jun. 27, 2014 issued in corresponding KR patent application No. 10-2013-0017752 (and English translation).

* cited by examiner

*Primary Examiner* — Steven Lim
*Assistant Examiner* — Omeed Alizada
(74) *Attorney, Agent, or Firm* — Posz Law Group, PLC

(57) ABSTRACT

An indoor unit of an air-conditioning apparatus is provided, the indoor unit which can easily cause a wireless remote controller to output sound and does not degrade the design of an appearance of a main body. A main body 1 includes a main-body communication device 40 that communicates with a wireless remote controller 10, an image pickup device 50 that captures an image of the inside of a room, and a controller 30. The wireless remote controller 10 includes a wireless-remote-controller communication device 15 and a sound output device 13. When the face of a person is present within a face recognition range in a field of the image pickup device 50 for a face recognition time, the controller 30 recognizes the face of the person. If the controller 30 recognizes the face of the person, the controller 30 causes an operating signal to be sent to the wireless remote controller 10. When the wireless remote controller 10 receives the operating signal, the wireless remote controller 10 activates the sound output device 13 and causes the sound output device 13 to output sound.

4 Claims, 5 Drawing Sheets

INDOOR UNIT OF AIR-CONDITIONING APPARATUS

TECHNICAL FIELD

The present invention relates to indoor units of air-conditioning apparatuses, and more particularly relates to an indoor unit of an air-conditioning apparatus including a wireless remote controller (remote operation means).

BACKGROUND ART

Conventionally, in order to enhance usability of a user (equivalent to an operator), a wireless remote controller (remote operation means) for remotely operating an air-conditioning apparatus is provided. Since the wireless remote controller is wireless, allowing the user to operate an indoor unit of the air-conditioning apparatus from anywhere in the room. Meanwhile, however, since the wireless remote controller is not fixedly placed at the same position, the wireless remote controller may be lost.

Owing to this, an invention is disclosed (for example, see Patent Literature 1), in which a wireless remote controller includes sound output means and the wireless remote controller outputs sound in response to a command issued from a main body, thereby the wireless remote controller notifies a user of the whereabouts (the place) of the remote controller, to save the time and effort for finding the remote controller when the wireless remote controller is lost.

CITATION LIST

Patent Literature

[Patent Literature 1] Japanese Unexamined Patent Application Publication No. 2002-320279 (pages 3 and 4, FIG. 3),

SUMMARY OF INVENTION

Technical Problem

However, with the indoor unit disclosed in Patent Literature 1, to cause the wireless remote controller to output sound, the user has to press a wireless-remote-controller search button arranged at the main body, so that a sound-output command signal is sent to the wireless remote controller.

Hence, since the user finds and operates the wireless-remote-controller search button, the work may be cumbersome. Also, since the main body is generally installed at a high position, in many cases, the user may not reach the wireless-remote-controller search button and the user cannot press the wireless-remote-controller search button. Further, if the wireless-remote-controller search button has noticeable shape, color, and size for ease of noticing the wireless-remote-controller search button, the design of an appearance of the main body may be degraded.

The present invention responds to such demands, and provides an indoor unit of an air-conditioning apparatus, the indoor unit of which can cause a wireless remote controller to output sound with ease and does not degrade the design of an appearance of a main body.

Solution to Problem

An indoor unit of an air-conditioning apparatus according to the present invention includes a main body installed on a wall surface in a room, and a wireless remote controller that communicates with the main body using an operating signal. The main body includes a main-body communication device that communicates with the wireless remote controller using the operating signal, an image pickup device that captures an image of the inside of the room, and a controller that controls the main-body communication device. The wireless remote controller includes a wireless-remote-controller communication device that receives the operating signal, and a wireless-remote-controller notification device that outputs at least one of sound, light, and vibration. The controller causes the main-body communication device to send the operating signal to the wireless-remote-controller communication device if the controller recognizes that a face of a person is present in a predetermined face recognition range in a field of the image pickup device for a predetermined face recognition time based on the image captured by the image pickup device. The wireless-remote-controller notification device outputs at least one of sound, light, and vibration when the wireless-remote-controller communication device receives the operating signal.

Advantageous Effects of Invention

With the indoor unit of the air-conditioning apparatus according to the present invention, the wireless remote controller outputs the at least one of sound, light, and vibration, when the user who searches for the wireless remote controller approaches the main body and turns user's face to the image pickup device only for the face recognition time. Accordingly, the user can recognize the current whereabouts (the place) of the wireless remote controller without any operation. Therefore, since the wireless remote controller can be easily and quickly found, convenience is increased.

DESCRIPTION OF EMBODIMENTS

Embodiment 1

Figure 1A:
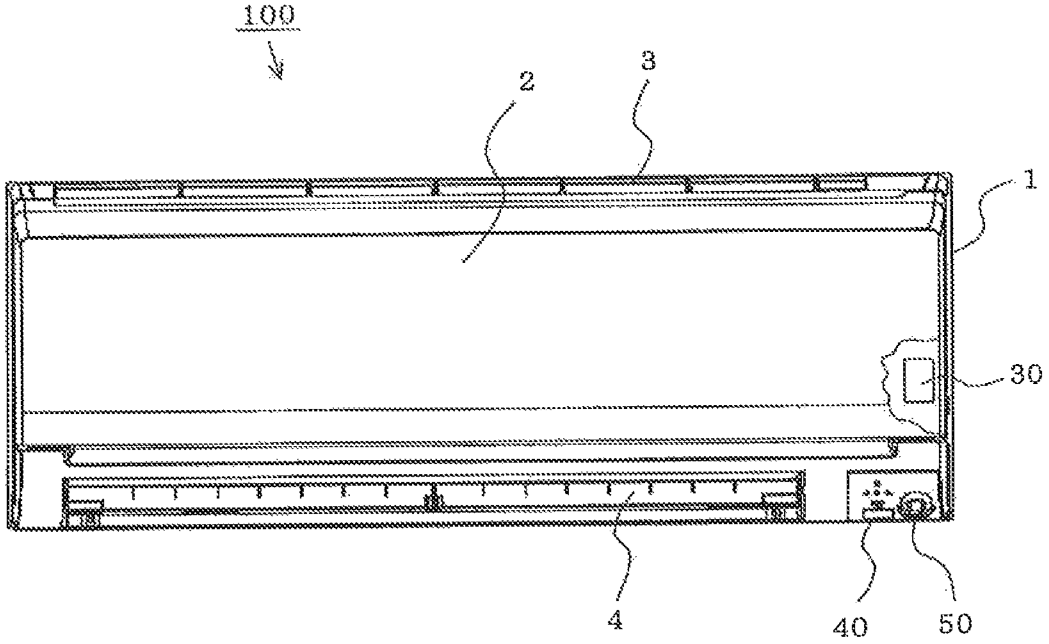
FIG. 1A explains an indoor unit of an air-conditioning apparatus according to Embodiment 1 of the present invention, FIG. 1A being a front view of a main body.
Figure 1B:
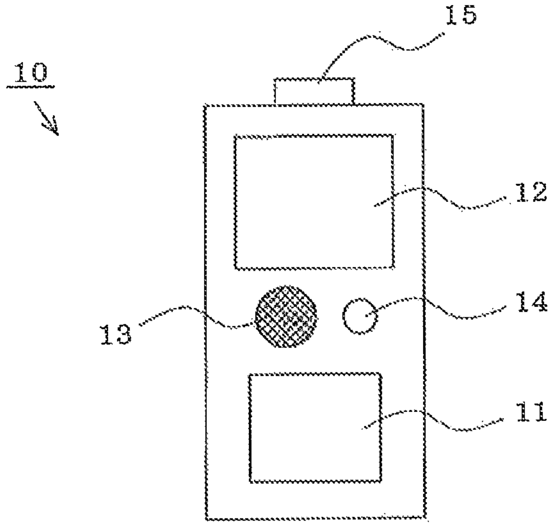
FIG. 1B explains an indoor unit of an air-conditioning apparatus according to Embodiment 1 of the present invention, FIG. 1B being a front view of a wireless remote controller.
Figure 2A:
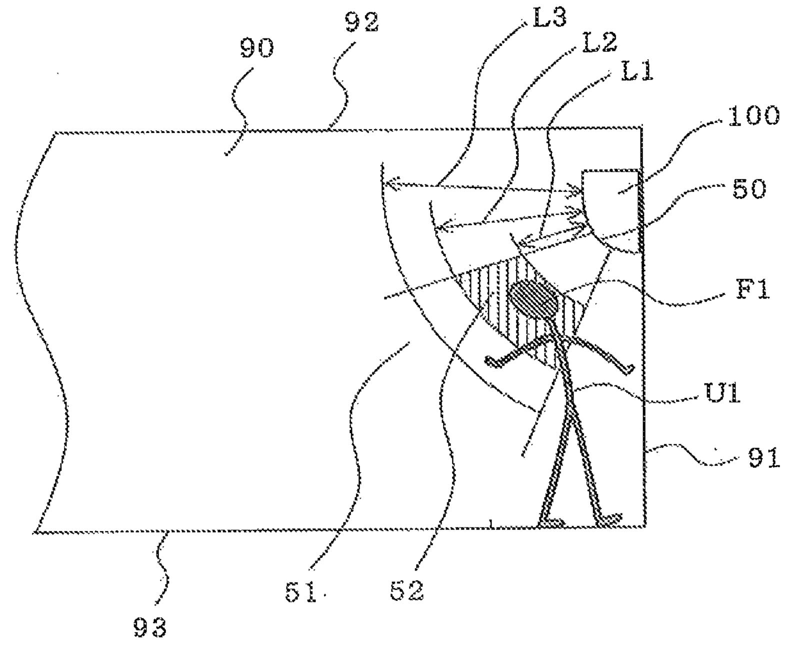
FIG. 2A provides a side view showing a function (recognition by face recognition) of the indoor unit shown in FIGS. 1A and 1B.
Figure 2B:
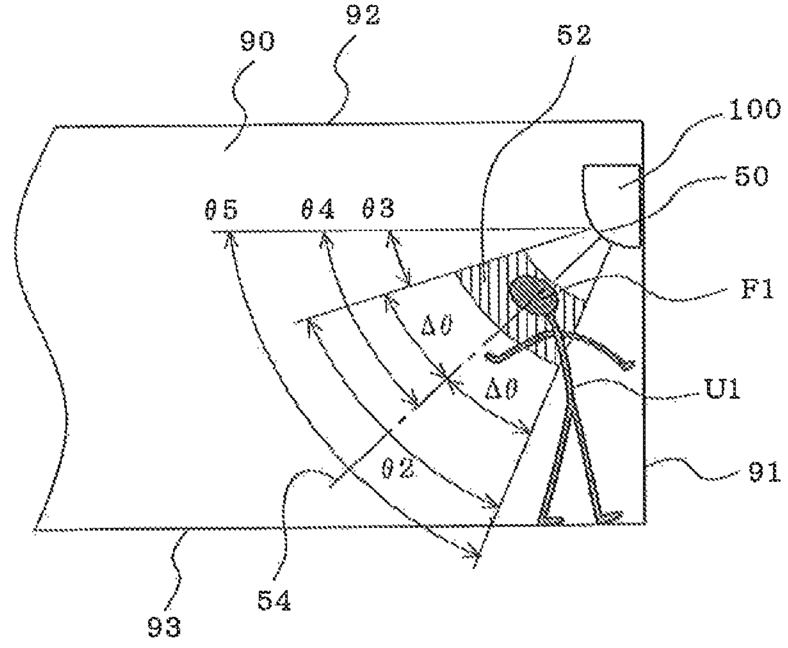
FIG. 2B also provides a side view showing a function (recognition by face recognition) of the indoor unit shown in FIGS. 1A and 1B.
Figure 3:
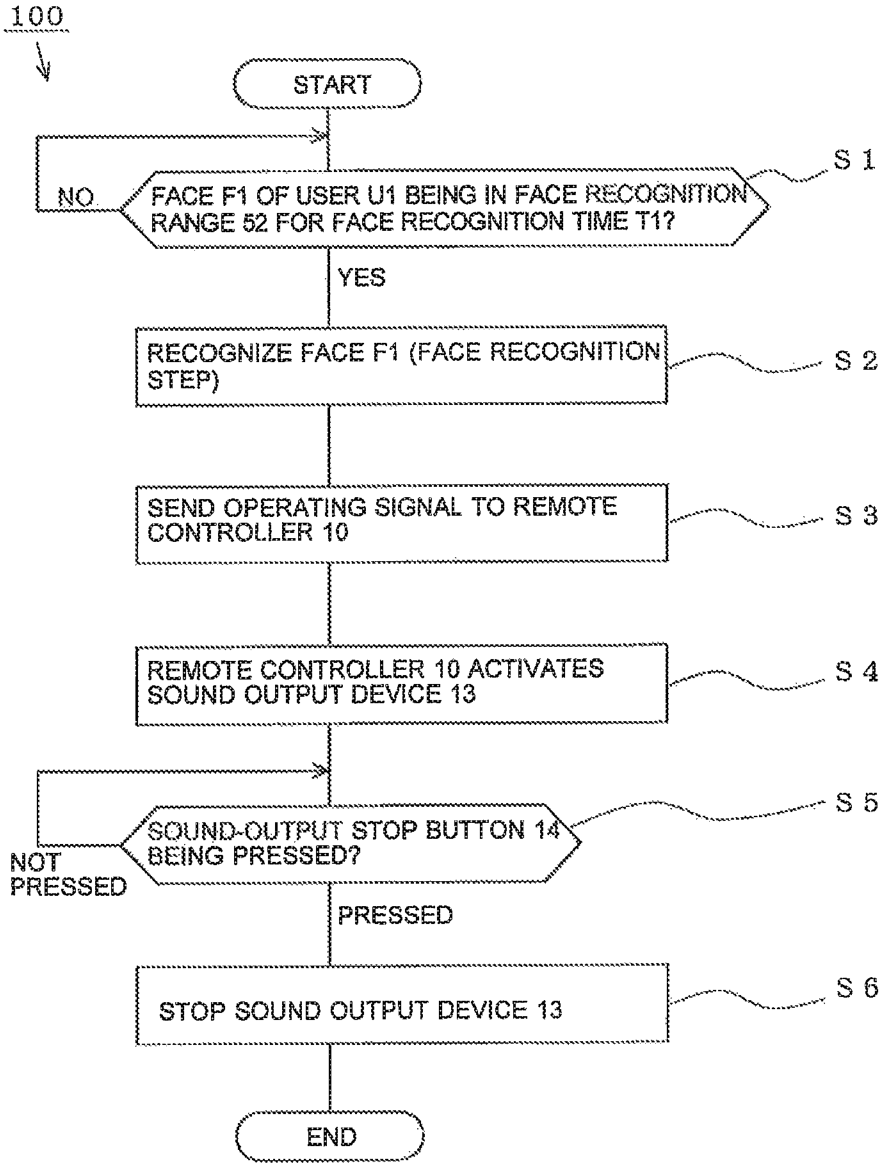
FIG. 3 is a flowchart showing a flow of an operation of the indoor unit shown in FIGS. 1A and 1B.

FIGS. 1 to 3 explain an indoor unit of an air-conditioning apparatus according to Embodiment 1 of the present invention. FIG. 1A is a front view of a main body. FIG. 1B is a front view of a wireless remote controller. FIGS. 2A and 2B are side views each showing a function (recognition by face recognition). FIG. 3 is a flowchart showing a flow of an operation. It is to be noted that the respective drawings are schematically illustrated, and the present invention is not limited to Embodiment 1 shown in the drawings.

(Main Body)

In FIG. 1A, an indoor unit 100 of the air-conditioning apparatus (hereinafter, called "indoor unit") includes a main body 1 having an air inlet 3 formed in an upper portion and an air outlet 4 formed in a lower portion, a front panel 2 that covers a front surface of the main body 1 in a manner that the front panel 2 can be opened and closed, a fan (not shown) that intakes the indoor air from the air inlet 3 and forms an air path to the air outlet 4, and a heat exchanger (not shown) arranged upstream of the fan (near the air inlet 3).

Also, a main-body communication device 40 that communicates with (sends and receives a signal to and from) an wireless remote controller (hereinafter, called "wireless remote controller") 10, an image pickup device 50 that captures an image of a state in the room, and a controller 30 that causes an operating signal to be sent to the wireless remote controller 10 based on information of a person whose image is captured by the image pickup device 50 are provided at positions beside the air outlet 4 at the front surface of the main body 1 (a portion of the front panel 2 corresponding to the position of the controller 30 being schematically shown in a perspective manner, the operating signal being actually sent by the main-body communication device 40).

The present invention does not limit the models and installation positions of the main-body communication device 40 and the image pickup device 50. For example, the main-body communication device 40 and the image pickup device 50 may be installed in a center portion or other portion of the front panel 2.

(Wireless Remote Controller)

In FIG. 1B, the wireless remote controller 10 sends an operation signal to the main body 1 (the main-body communication device 40) and receives running information and an operating signal from the main body 1. The wireless remote controller 10 includes an input device 11 with which a user U1 inputs an operation signal, a display device 12 that displays the input operation signal or the running information received from the main body 1, a sound output device 13 that outputs voice, a sound-output stop button 14 that stops the output of sound from the sound output device 13, and a wireless-remote-controller communication device 15 that allows communication with the main body 1.

(Face Recognition)

In FIG. 2A, the indoor unit 100 is installed on a wall (hereinafter, called "rear wall" 91 in a room 90, at a position near a ceiling 92.

Also, the image pickup device (for example, a CCD camera with 300,000 pixels) 50 has a field 51 toward an obliquely lower side. When a face F1 of the user U1 is present within a range (indicated by hatched lines in the drawing, called "face recognition range") 52 between a distance L1 and a distance L2 (L1<L2) from the image pickup device 50 in the field 51, the controller 30 recognizes the face F1.

Further, when the user U1 approaches the indoor unit 100 and is present at a distance smaller than a distance L3 (>L2) from the image pickup device 50, the controller 30 determines that "the user U1 intends to notify that the user U1 is present near the indoor unit 100." If the face F1 is not present within the face recognition range 52 although the user U1 is at a distance smaller than the distance L3, the controller 30 causes a main-body notification device (not shown) to notify the situation.

For example, the main-body notification device makes notification, for example, "a face cannot be recognized" or "please come closer" by voice, or causes a lamp indicative of that the face cannot be recognized to be lit or blinked. Alternatively, the main-body notification device may display characters or an image instead of the voice or the lighting or blinking of the lamp.

In contrast, if the face F1 is not recognized (if the face F1 is not within the face recognition range 52) when a predetermined face-recognition time (for example, 5 seconds) has elapsed although the user U1 is at a distance smaller than the distance L3 (>L2) from the image pickup device 50, the controller 30 determines that the person close to the indoor unit 100 is not "the person who searches for the wireless remote controller 10."

At this time, the main-body notification device (not shown) may be caused to notify the situation. For example, notification "the wireless remote controller does not output sound" is made by voice.

In FIG. 2B, the indoor unit 100 is installed on the rear wall 91. The image pickup device 50 is a CCD camera, is separated from the rear wall 91 by about 0.30 m in the horizontal direction, and is at a position with a height of about 2 m from a floor 93 to the upper side. A fish-eye lens (not shown) is mounted on the CCD camera. The fish-eye lens is arranged so that a center light-distribution axis 54 is at a depression angle θ4 of about 35°. A spread angle Δθ of 20° is arranged at each of the upper and lower sides around the center light-distribution axis 54. That is, a detection range θ2 (a range including the face recognition range 52) is arranged between an upper detection angle θ3 (15°=35°−20°) and a lower detection angle θ5 (55°=35°+20°).

(Controller)

In FIG. 3, the controller 30 of the indoor unit 100 controls, for example, the temperature and outlet amount of the conditioned air in accordance with the indoor environment or in response to the user's (a resident's) demand, and controls the main-body communication device 40 to send an operating signal for operating the sound output device 13 provided in the wireless remote controller 10.

To cause the main-body communication device 40 to send the operating signal, the user U1 who searches for the wireless remote controller 10 is required to approach the main body 1 so that the face of the user U1 has to be recognized.

First, the controller 30 determines whether or not the face F1 of the user U1 is present within the face recognition range 52 at least for a face recognition time T1 (for example, 5 seconds) (S1).

Then, if the face F1 of the user U1 is present within the face recognition range 52 for the face recognition time T1, the face F1 is recognized (S2).

In contrast, if the face F1 is not recognized, the process waits until the face F1 is recognized.

If the face F1 is recognized, the main-body communication device 40 is controlled so that the main-body communication device 40 sends the operating signal to the wireless remote controller 10 (S3).

Thereafter, when the wireless-remote-controller communication device 15 receives the operating signal, the wireless remote controller 10 activates the sound output device 13 and the sound output device 13 outputs sound (buzzer or chime) or voice (for example, "the wireless remote controller is here" etc.) (S4).

The sound or voice is continued until the user U1 finds the wireless remote controller 10 and the sound-output stop button 14 is pressed (S5). When the sound-output stop button 14 is pressed, the sound output device 13 is stopped (S6).

Accordingly, when the whereabouts (the place) of the wireless remote controller 10 is unknown, the user U1 is to be told of the whereabouts (the place) of the wireless remote controller 10 by the sound or voice output therefrom by only approaching the main body 1 to be recognized of one's face.

That is, since a special operation is not required, the wireless remote controller 10 can be easily and quickly found, and convenience is increased.

Also, since a send button or the like for sending the operating signal to the main body 1 does not have to be provided, the design of an appearance of the main body 1 is not degraded, and in addition, the convenience of the user U1 who cannot reach the main body 1 is markedly increased.

Embodiment 2

Figure 4:
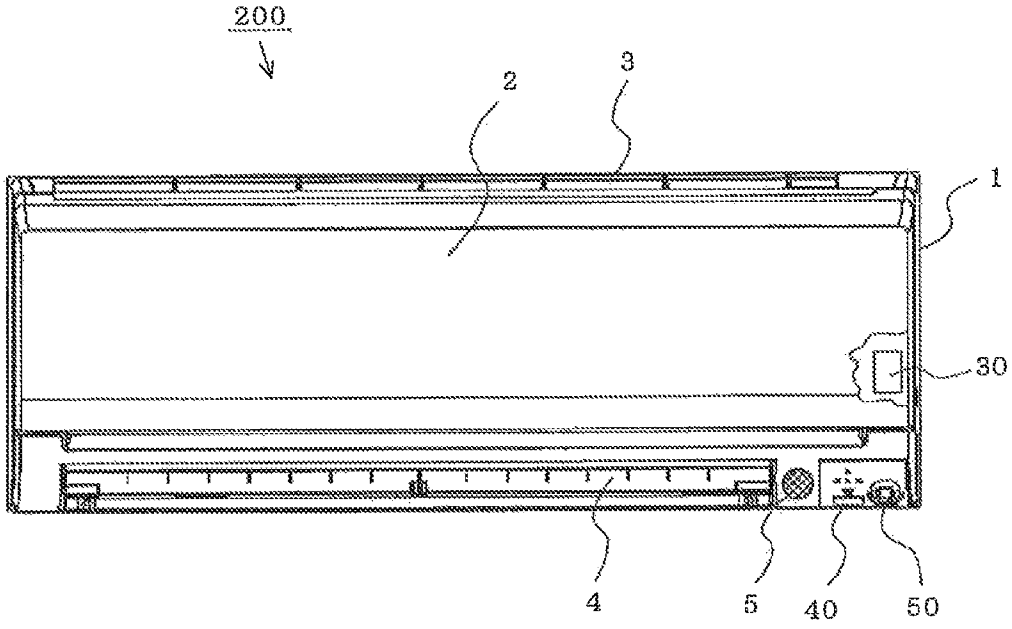
FIG. 4 is a front view of a main body of an indoor unit of an air-conditioning apparatus according to Embodiment 2 of the present invention.
Figure 5:
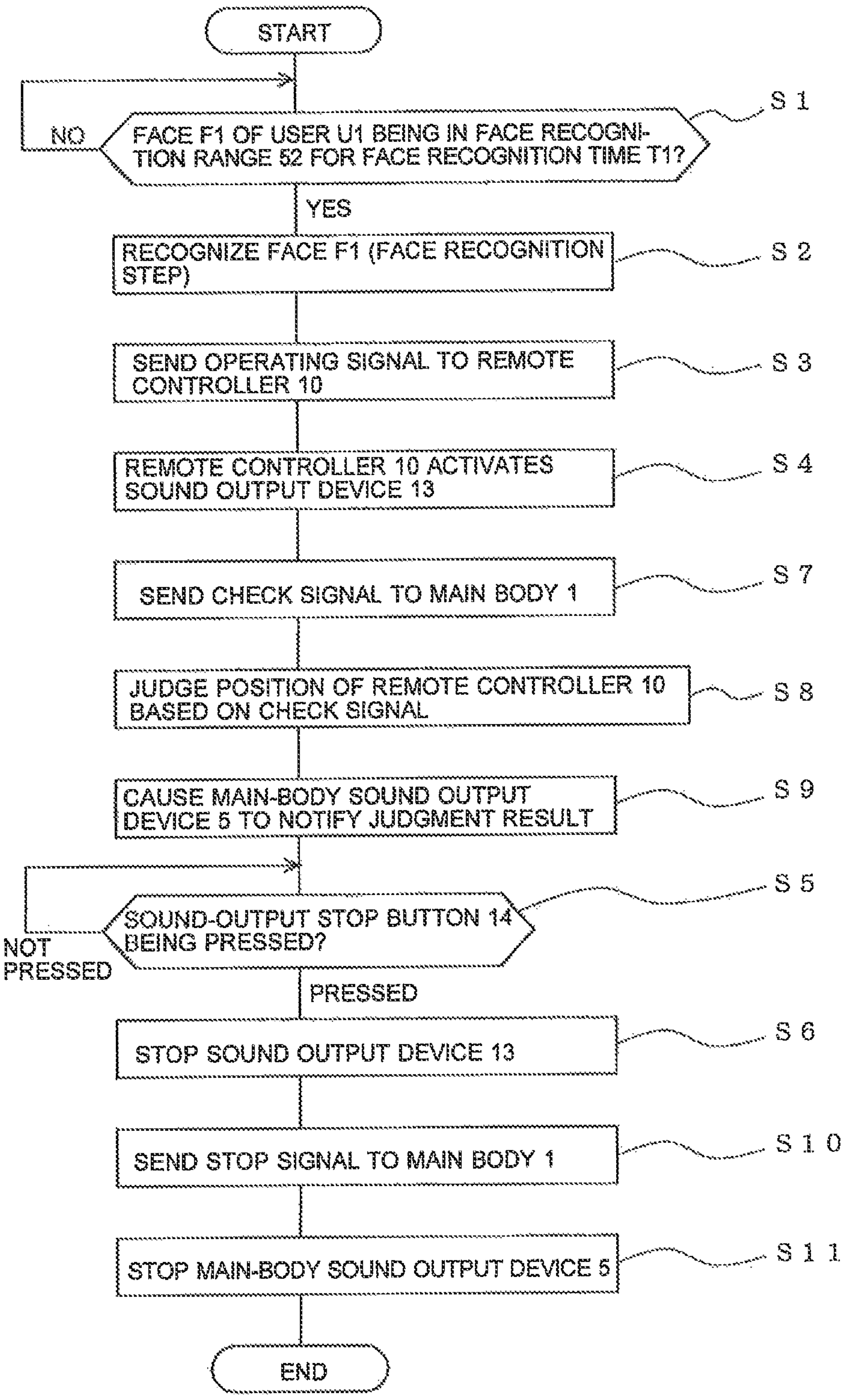
FIG. 5 is a flowchart showing a flow of an operation of the indoor unit shown in FIG. 4.

FIGS. 4 and 5 explain an indoor unit of an air-conditioning apparatus according to Embodiment 2 of the present invention. FIG. 4 is a front view of a main body. FIG. 5 is a flowchart showing a flow of an operation. Parts the same as or corresponding to those in Embodiment 1 refer the same reference signs, and the description is partly omitted.

In FIG. 4, a main-body sound output device 5 that outputs voice is provided at a main body 1 of an indoor unit 200 of the air-conditioning apparatus (hereinafter, called "indoor unit").

(Controller)

In FIG. 5, a controller 30 of the indoor unit 200 determines whether or not the face F1 of the user U1 is present within the face recognition range 52 at least for the face recognition time T1 (for example, 5 seconds) (S1).

Then, if the face F1 of the user U1 is present within the face recognition range 52 for the face recognition time T1, the face F1 is recognized (S2).

In contrast, if the face F1 is not recognized, the process waits until the face F1 is recognized.

If the face F1 is recognized, the main-body communication device 40 is controlled so that the main-body communication device 40 sends the operating signal to the wireless remote controller 10 (S3).

Then, when the wireless-remote-controller communication device 15 receives the operating signal, the wireless remote controller 10 activates the sound output device 13 and the sound output device 13 outputs sound (buzzer or chime) or voice (for example, "the wireless remote controller is here" etc.) (S4).

Also, when the wireless-remote-controller communication device 15 receives the operating signal, the wireless remote controller 10 sends a signal for notifying the main-body communication device 40 about the reception of the operating signal (hereinafter, called "acknowledgement signal") (S7).

If the main-body communication device 40 receives the acknowledgement signal, the controller 30 determines the position of the wireless remote controller 10 based on the acknowledgement signal (S8), and causes the main-body sound output device 5 to notify the determination result (S9). For example, the main-body sound output device 5 outputs voice such as "the wireless remote controller is located at the far right side in the room."

Further, when the user U1 finds the wireless remote controller 10 and presses the sound-output stop button 14 (S5), the sound output device 13 of the wireless remote controller 10 is stopped (S6), and a stop signal is sent to the main-body communication device 40 (S10).

Then, when the main-body communication device 40 receives the stop signal, the controller 30 stops the main-body sound output device 5 (S11).

Accordingly, with the indoor unit 200, like the indoor unit 100, when the current whereabouts (the place) of the wireless remote controller 10 is unknown, the user U1 is to be told of the whereabouts (the place) of the wireless remote controller 10 by the sound or voice output therefrom by only approaching the main body 1 to be recognized of one's face. In particular, the current whereabouts (the place) of the wireless remote controller is notified by voice also from the main body 1, in addition to the voice output from the wireless remote controller 10. The wireless remote controller 10 can be further easily and quickly found, and the convenience is further increased.

In the above description, the main-body sound output device 5 is provided at the main body 1. However, the present invention is not limited to the configuration. Instead of the output of voice, signage (for example, "the wireless remote controller is located at the left side near the main body" etc.) or a figure (an arrow indicative of the right direction etc.) may be projected on the front panel 2 from the inside of the main body 1.

Also, the device for determining the whereabouts of the wireless remote controller 10 based on the acknowledgement signal is not particularly limited. A plurality of the main-body communication devices 40 (or receiving antenna portions that form the main-body communication devices 40) may be provided at a plurality of positions of the main body 1, and the direction of the wireless remote controller 10 may be determined in accordance with intensities (intensity differences) of signals respectively received by the main-body communication devices 40 (or the receiving antenna portions).

REFERENCE SIGNS LIST

1: main body, 2: front panel, 3: air inlet, 4: air outlet, 5: main-body sound output device, 10: wireless remote controller, 11: input device, 12: display device, 13: sound output device, 14: sound-output stop button, 15: wireless-remote-controller communication device, 30: controller, 40: main-body communication device, 50: image pickup device, 51: field, 52: face recognition range, 54: center light-distribution axis, 90: room, 91: rear wall, 92: ceiling, 93: floor, 100: indoor unit (Embodiment 1), 200: indoor unit (Embodiment 2), F1: face, L1: distance, L2: distance, L3: distance, T1: face recognition time, U1: user, Δθ: spread angle, θ2: detection range, θ3: upper detection angle, θ4: depression angle, θ5: lower detection angle

The invention claimed is:

1. An indoor unit of an air-conditioning apparatus, comprising:
 - a main body installed on a wall surface in a room; and
 - a wireless remote controller that communicates with the main body using an operating signal,
 - wherein the main body includes a main-body communication device that communicates with the wireless remote controller using the operating signal, an image pickup device that captures an image of the inside of the room, and a controller that controls the main-body communication device,
 - wherein the wireless remote controller includes a wireless-remote-controller communication device that receives the operating signal, and a wireless-remote-controller notification device that outputs at least one of sound, light, and vibration,
 - wherein the controller is configured to
   - determine whether a face of a person is recognized as present in a predetermined face recognition range in a field of the image pickup device for a predetermined face recognition time based on the image captured by the image pickup device, trigger the main-body communication device to send the operating signal to the wireless-remote-controller communication device to activate the at least one of sound, light, and vibration at the wireless-remote-controller communication device when the face of the person is determined to be recognized as present, and wherein the wireless-remote-controller notification device outputs the at least one of sound, light, and vibration when the wireless-remote-controller communication device receives the operating signal to activate the at least one of sound, light, and vibration.

2. An indoor unit of an air-conditioning apparatus, comprising:

a main body installed on a wall surface in a room; and a wireless remote controller that communicates with the main body using an operating signal, wherein the main body includes a main-body communication device that communicates with the wireless remote controller using the operating signal, an image pickup device that captures an image of the inside of the room, and a controller that controls the main-body communication device, wherein the wireless remote controller includes a wireless-remote-controller communication device that receives the operating signal, and a wireless-remote-controller notification device that outputs at least one of sound, light, and vibration, wherein the controller causes the main-body communication device to send the operating signal to the wireless-remote-controller communication device if the controller recognizes that a face of a person is present in a predetermined face recognition range in a field of the image pickup device for a predetermined face recognition time based on the image captured by the image pickup device, wherein the wireless-remote-controller notification device outputs the at least one of sound, light, and vibration when the wireless-remote-controller communication device receives the operating signal, wherein the main body includes one of a main-body sound output device or a main-body display device, wherein the wireless remote controller sends an acknowledgement signal to the main-body communication device when the wireless-remote-controller communication device receives the operating signal, wherein, when the main-body communication device receives the acknowledgement signal, the controller determines a position of the wireless remote controller based on the acknowledgement signal, and wherein, the main-body sound output device or the main-body display device notifies the determined position of the wireless remote controller by voice or display.

3. The indoor unit of the air-conditioning apparatus of claim 1, wherein the main body includes one of a main-body sound output device or a main-body display device, wherein the wireless remote controller sends an acknowledgement signal to the main-body communication device when the wireless-remote-controller communication device receives the operating signal, wherein, when the main-body communication device receives the acknowledgement signal, the controller determines a position of the wireless remote controller based on the acknowledgement signal, and wherein, the one of the main-body sound output device or the main-body display device notifies the determined position of the wireless remote controller by voice or display.

4. The indoor unit of the air-conditioning apparatus of claim 1, wherein the wireless-remote-controller communication device includes a sound-output stop button, the main-body communication device sends the operating signal once to the wireless-remote-controller communication device when the sending of the operating signal is triggered, and the wireless-remote-controller notification device continues to output the at least one of sound, light, and vibration after receiving the operating signal, until the sound-output stop button at the wireless remote controller is pressed.

* * * * *